United States Patent
Wesseloh et al.

(10) Patent No.: US 11,273,916 B2
(45) Date of Patent: Mar. 15, 2022

(54) MULTIFUNCTIONAL SEAT ARRANGEMENT FOR A PASSENGER CABIN OF A VEHICLE

(71) Applicant: Airbus Operations GmbH, Hamburg (DE)

(72) Inventors: Marc Wesseloh, Hamburg (DE); Sven Prahl, Hamburg (DE); Frank Starke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 118 days.

(21) Appl. No.: 16/682,737

(22) Filed: Nov. 13, 2019

(65) Prior Publication Data
US 2020/0172249 A1    Jun. 4, 2020

(30) Foreign Application Priority Data
Nov. 29, 2018  (DE) .......................... 102018130231.2

(51) Int. Cl.
*B64D 11/06* (2006.01)
*B64D 11/00* (2006.01)

(52) U.S. Cl.
CPC .... *B64D 11/0612* (2014.12); *B64D 11/00151* (2014.12); *B64D 11/064* (2014.12); *B64D 11/0627* (2014.12); *B64D 11/0644* (2014.12)

(58) Field of Classification Search
CPC .......... B64D 11/0612; B64D 11/00151; B64D 11/0627; B64D 11/064; B60N 2/0292
See application file for complete search history.

(56) References Cited

U.S. PATENT DOCUMENTS

| | | | |
|---|---|---|---|
| 3,374,032 A * | 3/1968 | Del Giudice | B64D 11/06 297/394 |
| 4,536,027 A | 8/1985 | Brennan | |
| 6,012,679 A * | 1/2000 | Auestad | B64D 11/0693 244/118.6 |
| 6,913,227 B1 | 7/2005 | Mahmulyin | |
| 2005/0062324 A1* | 3/2005 | Shimasaki | B64D 11/064 297/312 |

(Continued)

FOREIGN PATENT DOCUMENTS

DE    102010035375 A1    3/2012
DE    10 2014 110819 A1    2/2016

(Continued)

OTHER PUBLICATIONS

European Search Report for Application No. 19212112 dated Apr. 28, 2020.

*Primary Examiner* — David R Dunn
*Assistant Examiner* — Christopher E Veraa
(74) *Attorney, Agent, or Firm* — Jenkins, Wilson, Taylor & Hunt, P.A.

(57) ABSTRACT

A multifunctional seat arrangement for a passenger cabin of a vehicle includes at least one first seat and one second seat which is laterally arranged directly adjacent to the at least one first seat. The second seat is narrower than the first seat, and the second seat has a pivotable seat surface extension which is pivotable into different positions relative to the seat surface of the second seat. Support functions and a child seat function or baby carrier function may be achieved thereby.

17 Claims, 7 Drawing Sheets

(56) References Cited

U.S. PATENT DOCUMENTS

| | | | |
|---|---|---|---|
| 2005/0087650 A1* | 4/2005 | Quan | B64D 11/0601 |
| | | | 244/118.6 |
| 2010/0026063 A1* | 2/2010 | Mosler | B64D 11/062 |
| | | | 297/237 |
| 2013/0175831 A1* | 7/2013 | Reh | B60N 2/3045 |
| | | | 297/135 |
| 2013/0234486 A1* | 9/2013 | Duus | B60N 2/753 |
| | | | 297/311 |
| 2015/0336485 A1 | 11/2015 | Lee | |
| 2017/0349105 A1* | 12/2017 | Karrer | B60N 3/104 |
| 2018/0099752 A1* | 4/2018 | Johnson | B64D 11/003 |
| 2018/0111532 A1* | 4/2018 | Huebner | B60N 2/919 |
| 2019/0031053 A1* | 1/2019 | Dry | B60N 2/32 |
| 2019/0031054 A1* | 1/2019 | Line | B60N 2/206 |
| 2019/0071181 A1* | 3/2019 | Demary | B64D 11/0696 |

FOREIGN PATENT DOCUMENTS

| | | |
|---|---|---|
| DE | 102015102315 A1 | 8/2016 |
| EP | 1 724 193 A1 | 11/2006 |

* cited by examiner

MULTIFUNCTIONAL SEAT ARRANGEMENT FOR A PASSENGER CABIN OF A VEHICLE

CROSS-REFERENCE TO PRIORITY APPLICATION

This application claims the benefit of, and priority to, German patent application number 102018130231.2, filed Nov. 29, 2018. The content of the referenced application is incorporated by reference herein.

TECHNICAL FIELD

Embodiments of the subject matter described herein relate generally to a multifunctional seat arrangement, a passenger cabin of a vehicle and a vehicle comprising a passenger cabin and at least one multifunctional seat arrangement which is arranged therein.

BACKGROUND

Passenger cabins of vehicles which serve for the transport of people are always subject to the requirement of enhancing the comfort of passengers without having to enlarge the constructional space required therefor. From an economic point of view, it is also expedient to increase the passenger capacity without restricting the well-being of the passengers. Many different ideas exist for designing a passenger cabin for very different vehicles with these considerations in mind.

It is known to design regions in a cabin of an aircraft, in which the cabin width differs from other regions due to the shape of the aircraft fuselage, in a different manner than is the case in purely cylindrical regions. Narrower seat rows and variable positioning of passenger seats are often selected there without optimally utilizing the constructional space which is present there. It is also known to accommodate entirely different equipment there. Patent document DE 10 2015 102 315 A1 proposes, for example, inserting an arrangement comprising a plurality of cabin monuments of different constructional depths which may be placed in rows relative to one another such that a closed front is produced on the aisle side. In patent document DE 10 2010 035 375 A1, however, it is also proposed to insert in such regions, in addition to passenger seats, a storage compartment which is arranged laterally outside on a cabin wall.

BRIEF SUMMARY

The embodiments of a cabin proposed in the prior art may provide specific functions but in each case these functions are limited to one functionality. In addition to simply utilizing a constructional space which is present it would be desirable to be able to provide entirely different functions without having to select these functions when fitting out the cabin.

It is an object of the disclosure to propose a seat arrangement for a passenger cabin of a vehicle, by means of which previously restricted usable cabin regions are able to be made more usable in order to enhance the comfort and to increase the passenger capacity.

This object is achieved by a seat arrangement having the features of independent Claim 1. Advantageous embodiments and developments may be derived from the subclaims and the following description.

A multifunctional seat arrangement for a passenger cabin of a vehicle is proposed, comprising at least one first seat and one second seat which is laterally arranged directly adjacent to the at least one first seat, wherein the at least one first seat has a first seat surface and a first backrest, wherein the second seat has a second seat surface, a second backrest and a seat surface extension which is pivotably mounted on the second seat surface and which is arranged opposite the second backrest, wherein the seat surface extension is at least configured to be pivoted into a position enclosing an angle of at least 90° relative to the seat surface, wherein the first seat surface and the second seat surface have the same seat height and wherein the second seat has a smaller width than the at least one first seat.

The at least one first seat is, in particular, a conventional passenger seat which has conventional dimensions for the vehicle. If the seat arrangement is located in a passenger cabin comprising a plurality of passenger seats, the first seat preferably corresponds to the design of the majority of the seats arranged in the passenger cabin or the majority of the seats arranged in the same class. At this point a more accurate qualification of the design of the at least one first seat is not able to be made since the dimensions and designs may vary for different vehicles, different cabin classes, different cabin designers and the like. As a result, the at least one first seat should be regarded as a (conventional) passenger seat.

The second seat, which is laterally arranged directly adjacent to the at least one first seat, however, is not a conventional passenger seat but differs therefrom. Firstly, the width of the second seat is smaller than that of the first seat. As a result, the seat arrangement is suitable, for example, for being arranged in a tapering cabin region which may be found, for example, in a commercial aircraft in a tail region. Since an interior trim of the passenger cabin follows the shape of the fuselage of the commercial aircraft and an aircraft fuselage conventionally has a conical shape in the tail region, the cabin width is consequently reduced in the tail region of the passenger cabin. Due to the general curvature of the aircraft fuselage, the arrangement of the second seat is only possible between an interior trim of the cabin and a first seat if the width of the second seat is adapted.

Additionally, the second seat comprises a seat surface extension which is pivotably mounted on the second seat surface. This permits a modification of the second seat as required, so that this second seat may have different functions. The seat surface extension could be positioned at different pivot angles from the second seat surface. This could permit, for example, the pivoting-up of the seat surface extension onto the second seat surface. As a result, the height of the second seat surface could be increased by the thickness of the seat surface extension. As a result, for example, a child could sit down on the second seat and be at a comfortable seat height at that point. A separate booster cushion which has to be transported would not then be required. Due to the lower second backrest, the child is also not restricted in terms of his/her personal seating comfort. Consequently, in this application case it would not be necessary to use a full passenger seat for the child, meaning that the second seat results in an additionally reservable seat.

On the other hand, by pivoting up the seat surface extension onto the second seat surface, a particularly comfortable support for the passenger could be provided on the directly adjacent first seat. Here, for example, a tray may be deposited or an additional working region is provided for the passenger. As a result, a foldable support surface arranged on a front seat would not have to be taken up by work equipment. As a result, when receiving meals the passenger does not have to fold away the support surface and take work equipment onto their lap or deposit the work equipment into a bag. Should the support surface be used nevertheless, the work equipment deposited there could simply be tidied away onto the support surface of the seat surface extension.

Due to the identical seat heights of the first seat surface and the second seat surface, when the seat surface enlargement is folded down the option is also provided to combine the second seat surface with the directly adjacent first seat surface, so that larger and/or overweight people are able to sit comfortably. Directly adjacent passengers are thus not restricted in their personal comfort. Since the second seat is only partially taken up, the shoulder of the relevant passenger oriented toward the interior trim may be comfortably accommodated.

Additionally, when a suitable pivoted position is adopted, a sleeping area for a baby could also be provided by the seat surface extension, so that on the second seat, for example, a type of baby carrier or cot is able to be provided without a parent being instructed to use a baby carrier suspended on a partition or a monument. This is also very convenient since a parent is able to sit on the directly adjacent first seat and adopt a very advantageous position relative to the baby, which clearly improves the well-being of these two passengers in comparison with the situation when a conventional baby carrier is used, since direct eye contact is not hindered.

In summary, the seat arrangement according to the disclosure permits a significant gain in comfort due to the plurality of different uses and, in addition, no further constructional space is taken up in a passenger cabin, which would then be unavailable for other uses or functions. At the same time, in specific cases the passenger capacity of the cabin may be increased and additional reservable options provided. The second seat in this case is directly adjacent to a cabin wall, i.e. a cabin interior trim.

In an advantageous embodiment, the seat surface extension is releasably lockable in a plurality of pivoted positions. As a result, the position of the seat surface extension may be blocked at specific pivot angles. The pivot angles in each case are to be adapted to the desired types of function of the second seat. At a first pivot angle, for example, the seat surface extension could be oriented toward a floor and, as a result, run approximately vertically to the floor. A second pivot angle could be configured such that the seat surface extension runs parallel to the second seat surface. A third conceivable pivot angle could, for example, enclose an angle of slightly more than 90° relative to the second seat surface, so that a comfortable boundary is present between the second backrest and the seat surface extension. If desired, a locking of the seat surface extension could take place at a fourth pivot angle, in which the seat surface extension bears against the second seat surface. However, this is not absolutely necessary. The locking could be implemented by a mechanism integrated in the second seat. This mechanism could be operated, for example, by actuating the seat surface extension itself. For example, when pivoted into the predetermined positions associated with the aforementioned pivot angles, the seat surface extension could be automatically latched and released again by actuating a handle element or by being pivoted up again.

Preferably, the second backrest and/or the second seat surface is configured to be folded flush onto the second seat surface. The second backrest and/or the seat surface extension may be pivoted onto the second seat surface, in particular, in order to take advantage of a support function. Depending on the constructional space present and, in particular, the seat spacing from the front seat, the second backrest may extend over a larger surface than the seat surface extension. As a result, by pivoting the second backrest onto the second seat surface, a larger support surface may be provided than with the seat surface extension. In this position, a passenger may deposit and/or use, in particular, work equipment.

Preferably, the second backrest and/or the seat surface extension has on a rear face a planar bearing surface with a non-slip coating. As a result, the planar bearing surface may also be effectively utilized by smaller objects which, assisted by the non-slip coating, do not slide down from the bearing surface. The bearing surface could be designed, in particular, to be hard-wearing and easy to clean. Optionally, a peripheral projection may be provided on the edge side in order to prevent objects from sliding off or rolling down.

Particularly preferably, the second backrest and/or the seat surface extension has on a rear face at least one recess for receiving an object. Such a recess could be designed in different ways. It is conceivable to insert a cup holder in which a passenger may place and optionally lock a beverage container in position. Moreover, slightly flatter recesses are also conceivable, with mobile devices such as for example a mobile telephone, a tablet PC, a notebook or the like being able to be deposited therein. By means of a flat recess an object may be secured against sliding. In particular, a recess could be configured in a trough-shaped manner.

In an advantageous embodiment, the second backrest may have on a rear face at least one electronic device which is couplable to a mobile device. In particular, inductive charging devices or charging connectors or conventional power sockets, which are coupled to a converter, for mobile devices are conceivable. These devices may optionally provide sufficient power for rapid charging of a notebook or similar devices. Components such as keyboards or other operating elements which are able to be coupled to mobile devices of a passenger via short-range radio, for example Bluetooth, are also conceivable.

Preferably, a foldably mounted armrest is integrated on the second seat and/or on the directly adjacent first seat, wherein the armrest is configured to be folded flush into a contour of the second backrest and/or of the first backrest of the directly adjacent first seat. The armrest may be configured, for example, such that it penetrates between a joint of the two adjacent backrests and at the same time provides a fully closed backrest which includes a first backrest and the second backrest. With the use of the second seat and the directly adjacent first seat by a single passenger, the well-being of the passenger is not restricted by an awkward armrest. Even with the use of the second seat by a child and, in particular, a baby, striking against a folded-up armrest may be prevented.

The second seat could also have a fastening device for retaining an additional child seat which is positionable onto the second seat surface. A child seat is thus directly connected to the second seat by mechanical means, such that it is securely retained. By the use of a seat which is already familiar, and to a large extent adapted to the child, the well-being and safety thereof may be enhanced.

The second backrest could be lower than the first backrest. Thus even regions of a passenger cabin, which do not provide any constructional space for an additional seat with a backrest of conventional height, may be more effectively utilized. A slightly narrower second seat, which additionally has a slightly shorter backrest, could be perfectly sufficient for a support function and for use by a child.

Preferably, the second seat has a belt which is able to be connected to a belt of the directly adjacent first seat. As a result, it is possible for both seats to be used by a single passenger and to connect together both belts such that the belt which results therefrom extends over both seats.

Particularly preferably, the second seat and the directly adjacent first seat do not enclose a gap relative to one another. The use of the two seats together is promoted thereby, as is the use of the second seat for a baby or small child, since the surface of the arrangement of the two seats is uniform and provides no risk of injury.

The disclosure further relates to a passenger cabin which comprises a floor, a cabin interior trim, a plurality of passenger seats which are arranged on the floor and at least one seat arrangement having the aforementioned features.

The disclosure further relates to an aircraft which comprises an aircraft fuselage and a passenger cabin as mentioned above which is configured therein. The seat arrangement could be arranged at any point in the passenger cabin. In addition to the aforementioned regions of a tapering aircraft fuselage, it is also conceivable to arrange the seat arrangement over entire longitudinal portions of the passenger cabin or even over the entire length of the passenger cabin.

The aircraft could have a conical shape at at least one axial end of the aircraft fuselage, at least in some regions, wherein the at least one seat arrangement is arranged at the relevant axial end. The conical shape may be present, in particular, in a tail region. Conventionally, the passenger seats extend so as to be uniformly distributed to the side of aisles along a longitudinal axis and a transverse axis. In the region of the conical shape, the usable cabin width is continuously reduced so that the number of seats arranged adjacent to one another in the transverse direction has to be reduced by one seat on at least one occasion. As a result, an approximately trapezoidal region may be present between the cabin interior trim and the outermost seat in the lateral direction, with a second seat with a slightly smaller width and/or with a slightly shorter second backrest being able to be integrated therein. The conical shape, however, is not limited to the tail region but could also be found in a nose region.

The seat arrangement could extend from an aisle to the cabin interior trim, wherein the first seat which is oriented toward the aisle terminates flush with the aisle. A staggered arrangement of seats for filling up a gap relative to the cabin interior trim, with a reduced number of seats, is not required due to the integration of the second seat. Thus a cabin having an exceptionally streamlined design may be provided.

In a further embodiment, the passenger cabin has at least one seat row between two aisles, said seat row having at least one seat arrangement. This seat row may be an intermediate row which in the longitudinal direction is adjacent to a seat row which exclusively has first seats. The width of the adjacent seat row may be larger or smaller depending on its relative position. If the intermediate row is arranged in a tail region of a passenger cabin, a seat row which is located to the front thereof in the longitudinal direction may have a greater width and exclusively contain first seats. The number of first seats of the seat row located to the front thereof may be greater by 1 than the number of first seats of the intermediate row. A seat row located to the rear thereof in the longitudinal direction may have a smaller width and only contain first seats. The number of first seats of the seat row located to the rear thereof may be identical to the number of first seats of the intermediate row, and then only the second seat would be absent. The intermediate row may, as a result, provide a transition between two seat rows which differ in the number of first seats thereof.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses are disclosed in the following description of the exemplary embodiments and the figures. In this case, all of the features described and/or shown illustratively form per se and in any combinations the subject matter of the disclosure irrespective of the combination thereof in the individual claims or the back-references thereof. In the figures, moreover, the same reference numerals represent objects which are the same or similar.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
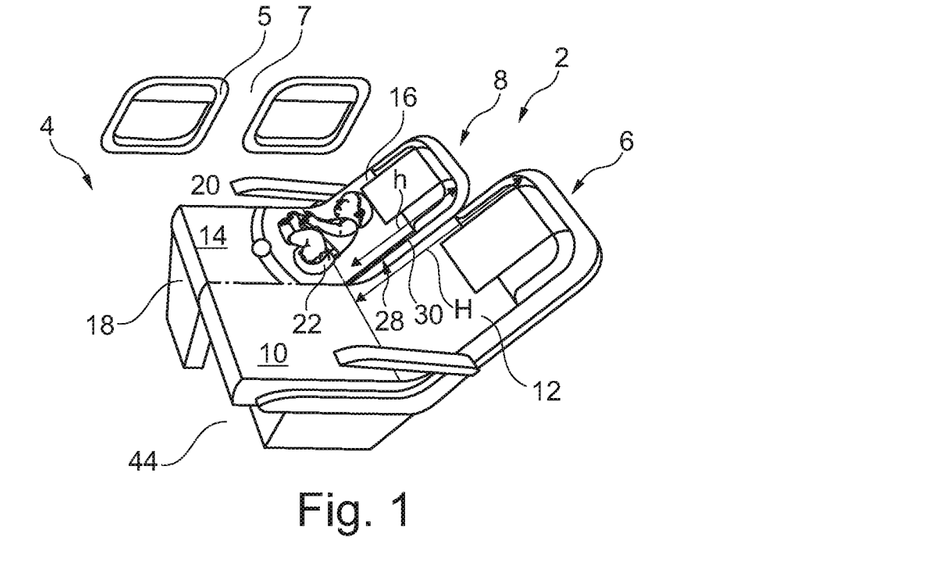
FIGS. 1 to 6 show a seat arrangement in different configurations in a three-dimensional view.

FIG. 1 shows a multifunctional seat arrangement 2 for a passenger cabin 4 of a vehicle. The seat arrangement 2 has, in the exemplary embodiment shown, a first seat 6 and a second seat 8 which is laterally arranged directly adjacent to the first seat 6. The second seat 8 directly adjoins a cabin interior trim 7 and, as a result, is oriented toward a cabin window 5.

The first seat 6 has a first seat surface 10 and a first backrest 12. Similarly, the second seat 8 has a second seat surface 14 and a second backrest 16. Additionally, a seat surface extension 18 is pivotably mounted on a side of the second seat surface 14 opposing the second backrest 16. The second backrest 16 has a lower height h than the first backrest 12, the height thereof being identified by H. Moreover, it may be seen that the second seat 8 has a smaller width than the first seat 6.

The second seat 8 may be provided with a seatbelt 20 which, in particular, is adapted for small children. As a result, an optimal restraint of a child is possible by the seatbelt 20 being able to fit snugly in a suitable manner against the hips. Due to the smaller height h of the second backrest 16 a comfortable support of the back and shoulders is possible, even in the case of small children.

The view in FIG. 1 schematically shows a baby 22 who is located on the second seat surface 14. In this position, a nappy change could be carried out, for example, or in this position an additional child seat (not shown) could be arranged on the second seat 8. In order to be able to provide a larger reclining surface, the seat surface extension 18 may be pivoted up.

Figure 2:
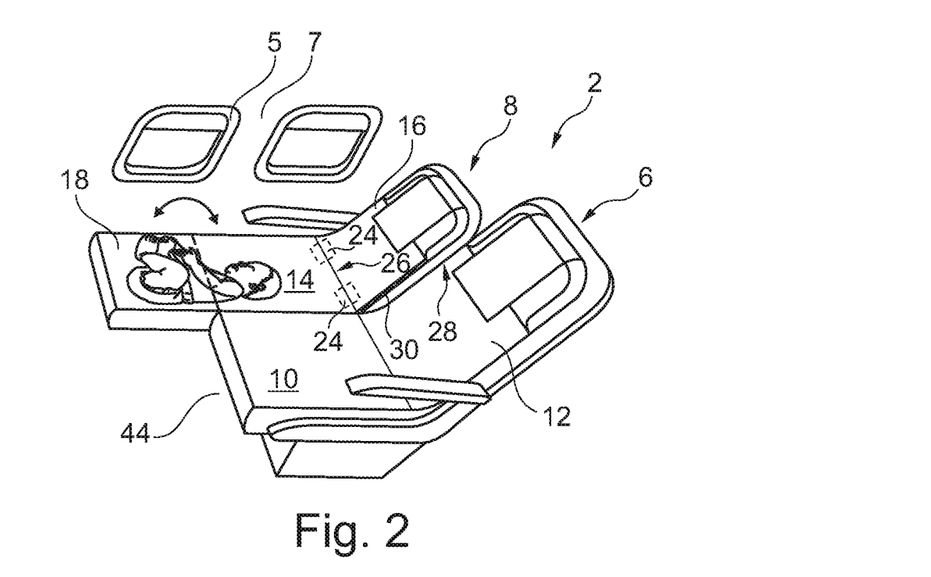

In FIG. 2 the seat surface extension 18 is shown with the pivoted-up seat surface extension 18 which runs parallel to the second seat surface 14. The angle enclosed between the second seat surface 14 and the seat surface extension 18 is approximately 180°. The second seat surface 14 and the seat surface extension 18, as a result, provide a relatively large surface which could serve for sleeping purposes in the case of a baby or small child. Preferably, the seat surface extension 18 on this side is particularly soft so that comfortable reclining is possible.

In particular, in the case of very small children it could also be provided to arrange an additional baby carrier or a flat reclining seat here and, in particular, to fasten said baby carrier or reclining seat by the seatbelt 20 to the second seat 8. Alternatively or additionally, fastening devices 24 may also be arranged in a transition region between the second seat back 16 and the second seat surface 14, said fastening devices serving for fixing an additional baby seat or child seat. These fastening devices may be arranged so as to be concealed in a joint 26 and designed in a similar manner to that provided in a motor vehicle.

With reference to FIGS. 1 and 2 it is also clear that both seat surfaces 10 and 14 have the same height and both backrests 12 and 16 are arranged flush and adjacent to one another. It is conceivable that the second backrest 16 is always arranged parallel to the first backrest 12, so that both backrests 12 and 16 behave in the manner of a single backrest. However, it is also conceivable that the second backrest 16 in these configurations always remains in the position shown here and may not be pivoted further to the rear.

In a further joint 28 which runs between the two backrests 12 and 16, a pivotably mounted armrest 30 is arranged. This armrest is configured in the exemplary embodiments such that it disappears completely into the joint 28, as soon as it is pivoted toward the backrests 12 and 16. As a result, an embodiment of both backrests 12 and 16 as a combined backrest is not excluded.

Figure 3:
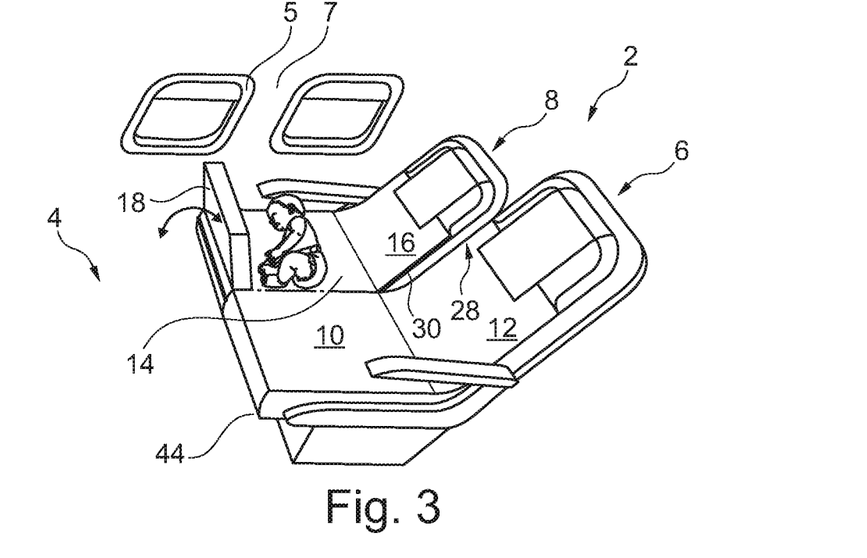

FIG. 3 shows a further possible position of the seat surface extension 18. Here the second seat surface 14 and the seat surface extension 18 enclose an angle of approximately 100°. If a parent of the baby 22 is seated on the first seat 6, the baby is fully protected from falling out between the cabin interior trim 7, the second backrest 16, the seat surface extension 18 and the parent. In such a position, undisturbed sleep is possible.

Figure 4:
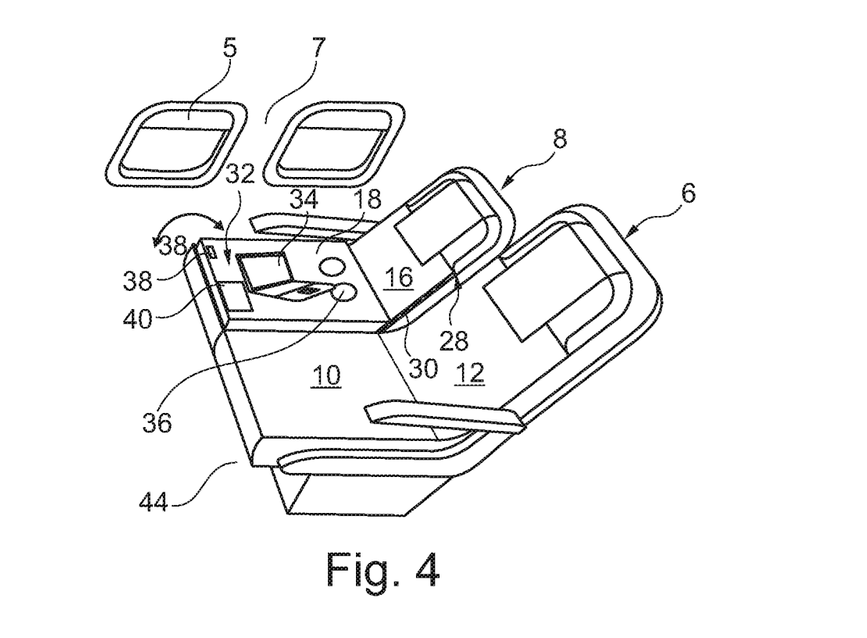

In a further configuration which is shown in FIG. 4, the seat surface extension 18 is fully folded onto the second seat surface 14 so that it bears flush thereagainst. Preferably, the seat surface extension has a planar rear face 32 which has a non-slip coating. A user who is seated on the first seat 6 may deposit personal belongings here, such as for example a notebook 34 and paper documents. The rear face 32 may also comprise cup holders 36 or other recesses which permits a user to deposit beverage containers or other objects in a secure manner. This is particularly convenient since the height of the rear face 32 is greater than the height of the first seat surface 10 and, as a result, the deposited objects are able to be reached more easily. Moreover, the rear face 32 may be provided with power connections 38 which permit a user to charge up mobile terminal devices. In addition to proprietary interfaces, conventional power sockets and connections for rapid charging of notebooks or similar larger devices, connections having small DC voltages of low power, such as for example USB connections, are also conceivable. Additionally or alternatively, inductive charging devices 40 may also be integrated in the rear face 32 and may be marked by an instruction correspondingly printed thereon. Since electrical devices are conventionally present in a passenger seat the provision of the seat surface extension 18 with these components is readily conceivable.

Figure 5:
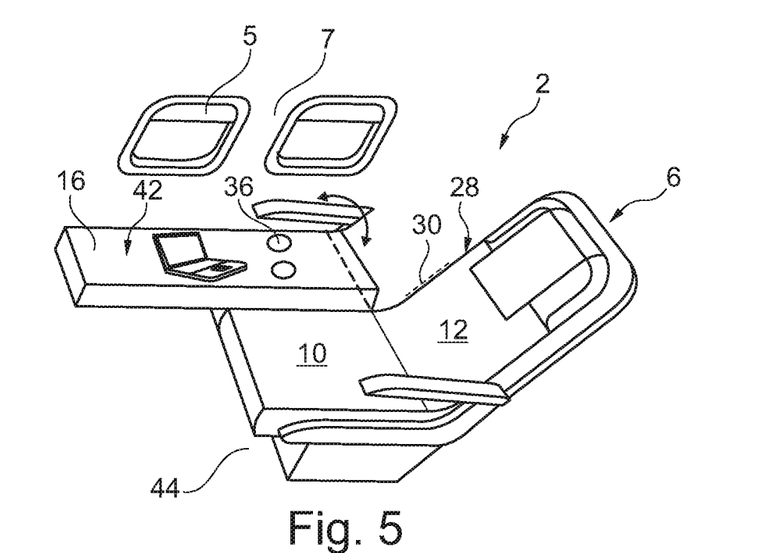

In FIG. 5 an alternative or additional variant is shown. Here the second backrest 16 is fully pivotable onto the second seat surface 14. For depositing objects a rear face 42 of the second backrest 16 is provided with a non-slip surface which is also preferably entirely flat. Cup holders 36 or other recesses, which are shown in slightly more detail in a figure further below, could also be provided here.

Figure 6:
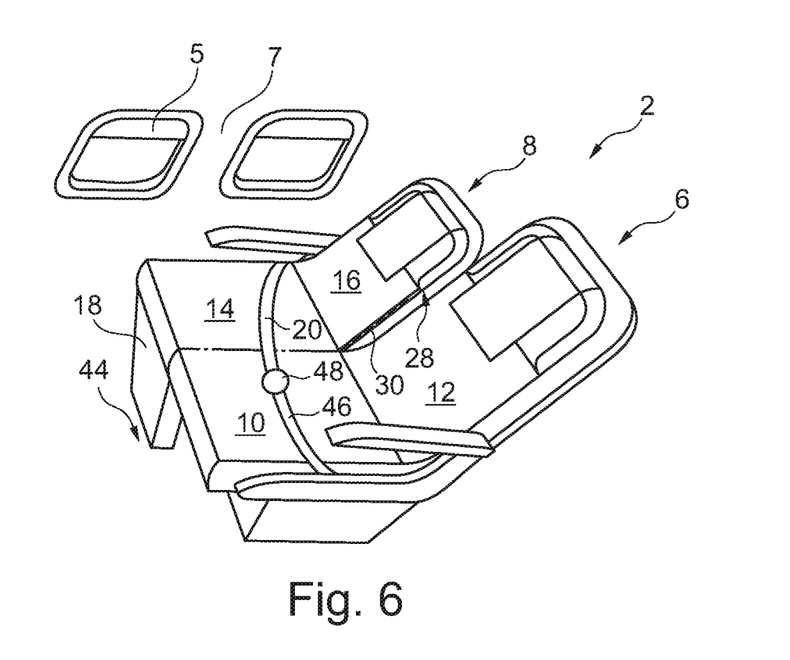

In FIG. 6 a further configuration is shown in which the seat surface extension 18 faces away from the second seat surface 14 toward a cabin floor 44. The armrest 30 is located in the folded-up position and a seatbelt 46 of the first seat 6 is connected to the seatbelt 20 of the second seat 8 via a belt buckle 48. To this end, in particular, the second seat 8 has a belt buckle 48. The longer seatbelt formed thereby extends over both seat surfaces 10.

Figure 7A:
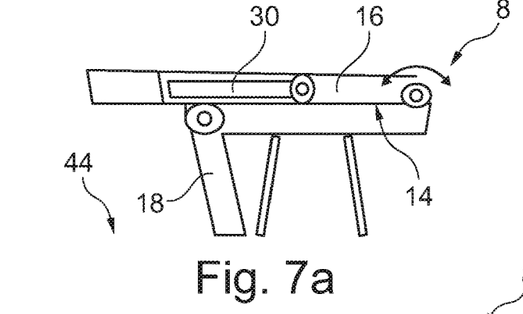
FIGS. 7a and 7b show the second seat in a side view in a plurality of different configurations.
Figure 7B:
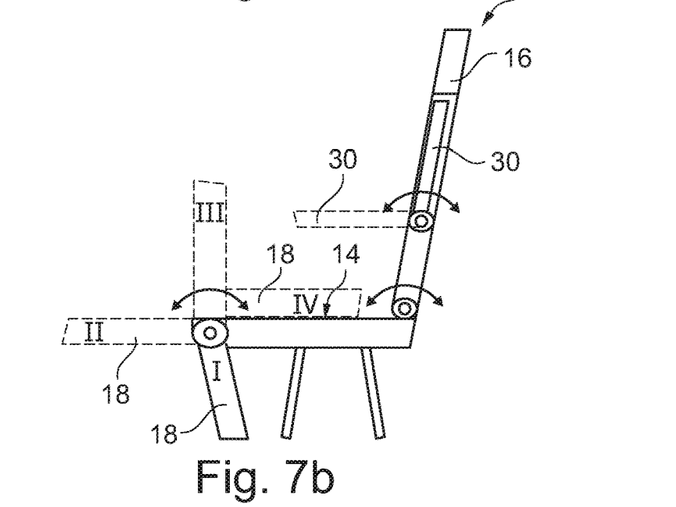

FIGS. 7a and 7b show once again the different configurations of the second seat 8 in a side view. Whilst in FIG. 7a the second backrest 16 which bears against the second seat surface 14 is shown, whilst the seat surface extension 18 faces the cabin floor 44, FIG. 7b shows the possible positions of the seat surface extension 18 when the second backrest 16 is folded up. The position of the seat surface extension 18 identified by I represents a conventional seating mode, in particular for an adult, or when using the second backrest 16 as a support. In the position II the seat surface extension 18 is arranged parallel to the second seat surface 14 and may be used for changing a nappy of a baby 22 or as a reclining surface for a baby or a small child. The position III represents the configuration shown in FIG. 3 in which a baby 22 is securely protected from falling off. The position IV permits the use of the seat surface extension 18 as a support.

Figure 8:
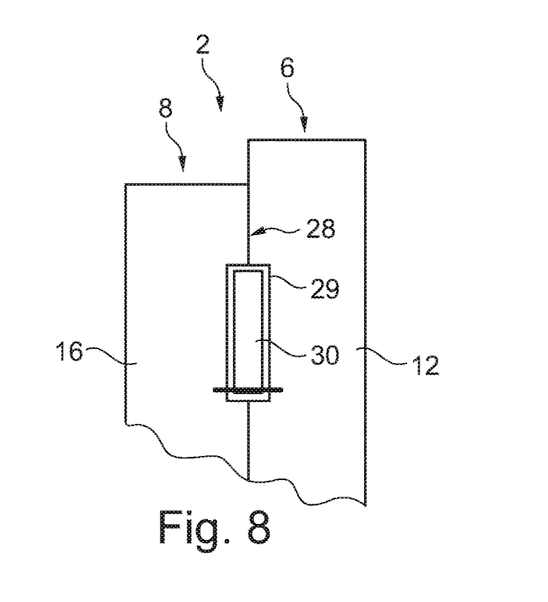
FIG. 8 shows the backrests of a first seat and of the second seat in a front view.

FIG. 8 shows in a plan view the size ratios of the two backrests 12 and 16 as well as an arrangement of the armrest 30 which disappears into the joint 28 when it is folded up. A cutout 29 which is dimensioned for receiving the armrest 30 could be present in or behind the joint 28. The cutout 29 may extend laterally into both adjacent backrests 12 and 16.

Figure 9:
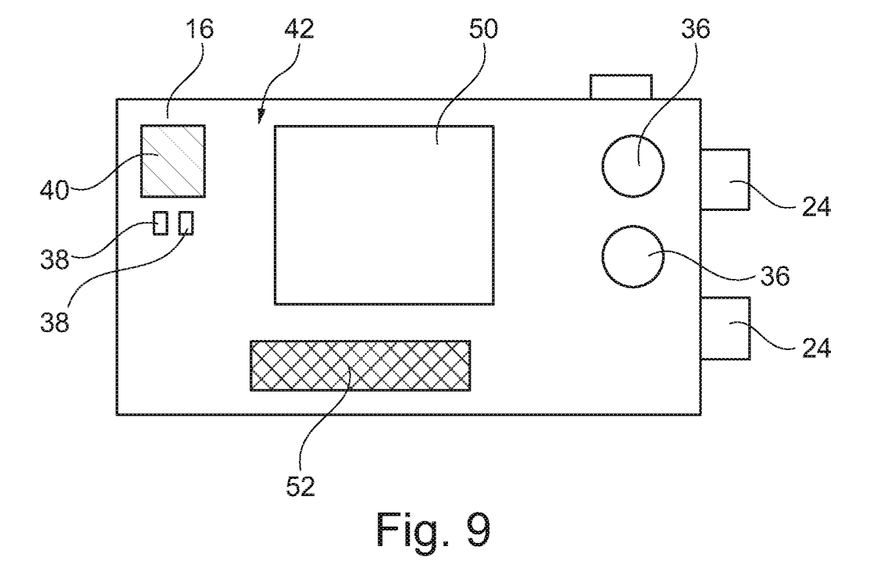
FIG. 9 shows a plan view of the rear face of the second backrest.

FIG. 9 shows the rear face 42 of the second backrest 16 in which adjacent to the cup holders 36 a trough-shaped recess 50 is also arranged, in order for example to secure a mobile terminal device from sliding down. By way of example, an input device 52 is arranged in the rear face 42 and could be connected wirelessly to a mobile terminal device. By way of example, a wireless keyboard 52 is indicated here.

Figure 10:
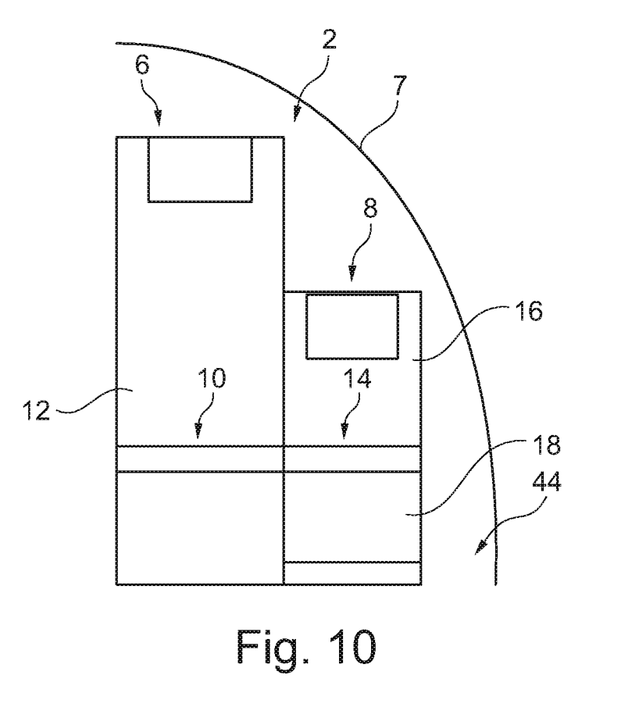
FIG. 10 shows an installed situation of a first seat and of the second seat in a front view.

FIG. 10 shows the two backrests 12 and 16 in a size comparison directly adjacent to the cabin interior trim 7. Here it is clear that the available constructional space between the first seat 6 and the cabin interior trim 7 is utilized very effectively by the second seat 8, and the second backrest 16 due to its reduced height is fitted very efficiently into the available constructional space.

Figure 11:
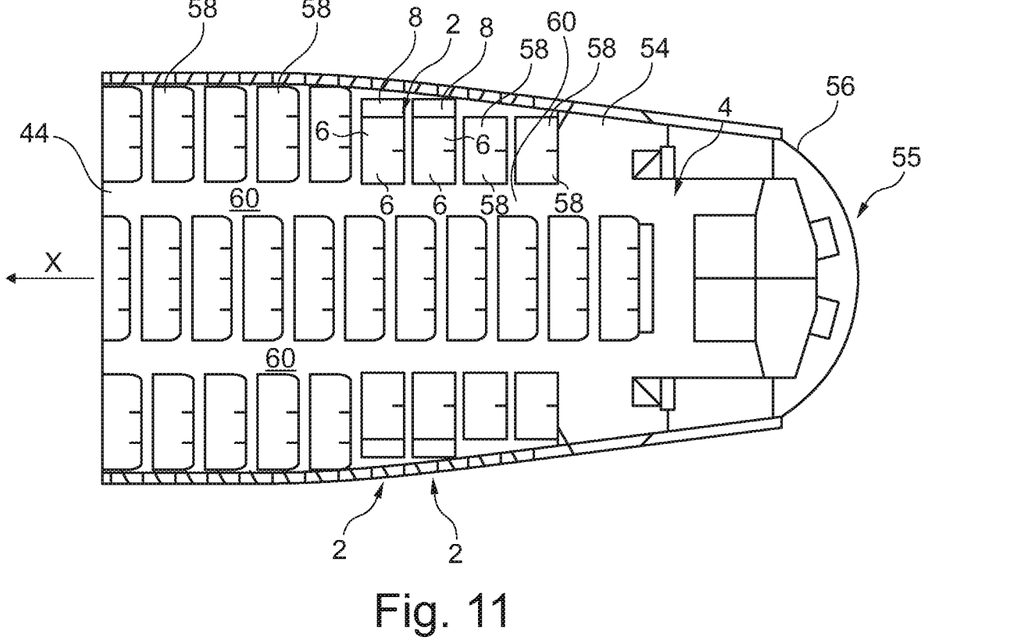
FIG. 11 shows a tail cone of an aircraft fuselage in a sectional plan view.

FIG. 11 demonstrates by way of example the position of two seat arrangements 2 located one behind the other, with in each case two first seats 6 and one second seat 8 in a tail cone 54 at a tail region 55 as an axial end of an aircraft fuselage 56 in which the available constructional space counter to a longitudinal direction x becomes narrower. The second seats 8 are directly adjacent to the cabin interior trim. To the front of the seat arrangements 2 in the longitudinal direction x, numerous passenger seats 58 are arranged in rows of three, wherein each passenger seat 58 may correspond to a first seat 6. By way of example two rows, with in each case two passenger seats 58, are arranged to the rear of the seat arrangements 2. The space taken up by the seat arrangements 2 is not sufficient for three conventional passenger seats 58 which are arranged adjacent to one another. However, in the case of two passenger seats 58 the constructional space would produce a relatively large gap with the cabin interior trim. This gap is closed in each case by a second seat 8. Particularly advantageously, no lateral offset is present between the seats oriented toward an aisle 60 so that all seats 6 and 58 terminate flush with the aisle 60.

Figure 12:
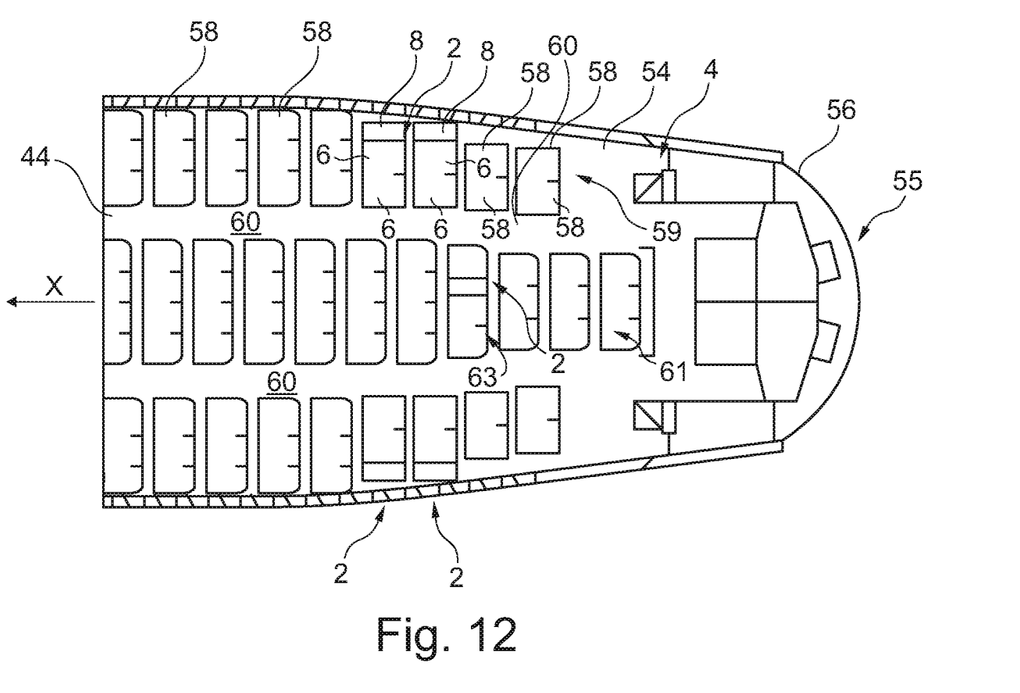
FIG. 12 shows a slightly modified version of the view of FIG. 11.

FIG. 12 shows a slightly modified variant of the cabin 4 in which a plurality of outer seat rows 59 in the lateral direction, which in each case have passenger seats 58, are laterally offset slightly inwardly. The cabin 4 additionally has central seat rows between the aisles 60. The majority thereof are provided with four passenger seats 58. Three central seat rows 61 which in each case have three conventional passenger seats 58 are arranged in the region of the seat rows 59 laterally offset inwardly. A seat row 63, which is called the intermediate row here and which is arranged between the seat rows 61 and the seat rows with four passenger seats 58 located to the front thereof, however, has two passenger seats 58 and a seat arrangement 2 which is inserted into the intermediate row 63. It might also be conceivable to arrange these intermediate rows 63 or any other seat row with a seat arrangement 2 integrated therein in other regions of the cabin 4.

Figure 13:
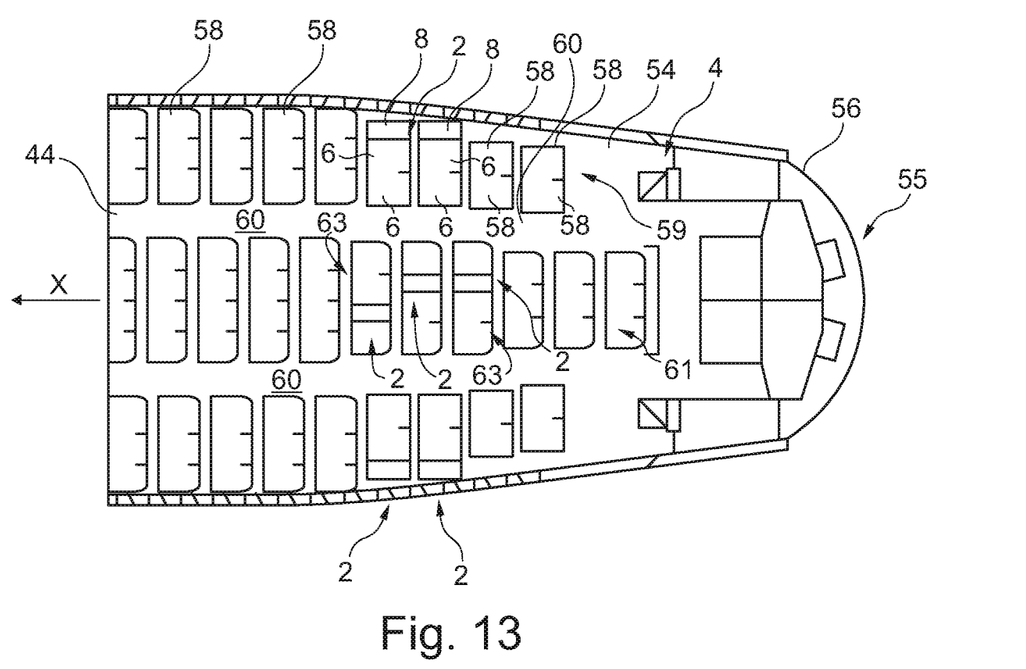
FIG. 13 shows a further modified view based on FIG. 11.

A plurality of intermediate rows 63 which are provided with a seat arrangement 2 are shown in FIG. 13. The positioning of the seat arrangement 2 is variable so that, for example, in each case successive intermediate rows 63 have a seat arrangement 2 at different positions.

Figure 14:
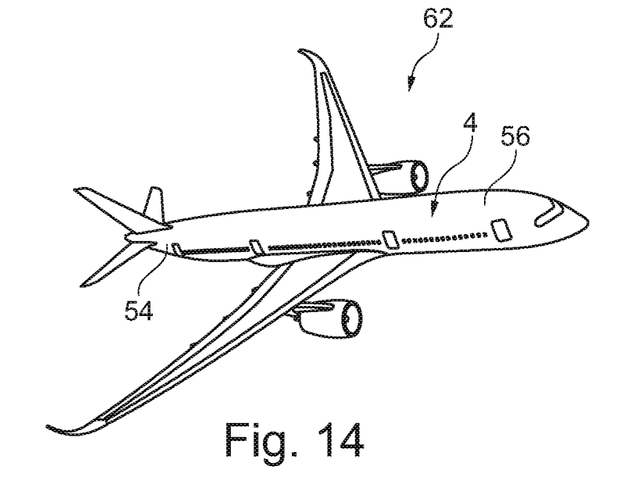
FIG. 14 shows an aircraft in a three-dimensional view.

Finally, FIG. 14 shows an aircraft 62 with the aircraft fuselage 56, the tail cone 54 and the passenger cabin 4 in which at least one seat arrangement 2 is provided.

It should also be mentioned that "comprising" does not exclude other elements or steps and "one" or "a" does not exclude a plurality. Moreover, it should be mentioned that features which have been described with reference to one of the above exemplary embodiments may also be used in combination with other features of other exemplary embodiments described above. Reference numerals in the claims are not to be regarded as a limitation.

REFERENCE NUMBERS

2 Seat arrangement
4 Passenger cabin
5 Cabin window
6 First seat
7 Cabin interior trim
8 Second seat
10 First seat surface
12 First backrest
14 Second seat surface
16 Second backrest
18 Seat surface extension
20 Seatbelt
22 Baby
24 Fastening device
26 Joint
28 Joint
29 Cutout
30 Armrest
32 Rear face (of the seat surface extension)
34 Notebook
36 Cup holder
38 Power connection
40 Inductive charging device
42 Rear face (of the second backrest)
44 Cabin floor
46 Seatbelt
48 Belt buckle
50 Trough-shaped recess
52 Input device
54 Tail cone
55 Tail region
56 Aircraft fuselage
58 Passenger seat
59 Outer seat row
60 Aisle
61 Central seat row
62 Aircraft
63 Seat row/intermediate row

What is claimed is:

1. A multifunctional seat arrangement for a passenger cabin of a vehicle, comprising:
   at least one first seat comprising a first seat surface and a first backrest; and
   one second seat laterally arranged directly adjacent to the at least one first seat;
   wherein the second seat has a second seat surface, a second backrest and a seat surface extension pivotably mounted on the second seat surface and arranged opposite the second backrest;
   wherein the seat surface extension is releasably lockable in a plurality of pivoted positions including at least a first position in which the seat surface extension is oriented towards a cabin floor, a second position in which the seat surface extension is arranged parallel to the second seat surface, a third a position which encloses an angle of at least 90° relative to the second seat surface and in which it faces the second backrest, and a fourth position in which the seat surface extension is folded flush onto the second seat surface;
   wherein the first seat surface and the second seat surface have the same seat height; and
   wherein the second seat has a smaller width than the at least one first seat.

2. The seat arrangement according to claim 1, wherein the second backrest is configured to be folded flush onto the second seat surface.

3. The seat arrangement according to claim 2, wherein the second backrest has on a rear face a planar bearing surface with a non-slip coating.

4. The seat arrangement according to claim 2, wherein the second backrest has on a rear face at least one recess for receiving an object.

5. The seat arrangement according to claim 2, wherein the second backrest has on a rear face at least one electronic device which is couplable to a mobile device.

6. The seat arrangement according to claim 1, wherein the seat surface extension has on a rear face a planar bearing surface with a non-slip coating.

7. The seat arrangement according to claim 1, wherein the seat surface extension has on a rear face at least one recess for receiving an object.

8. The seat arrangement according to claim 1, wherein the seat surface extension has on a rear face at least one electronic device which is couplable to a mobile device.

9. The seat arrangement according to claim 1, further comprising a foldably mounted armrest integrated on the second seat and/or on the directly adjacent first seat, wherein the armrest is configured to be folded flush into a contour of the second backrest and/or the first backrest of the directly adjacent first seat.

10. The seat arrangement according to claim 1, wherein the second seat has a fastening device for retaining an additional child seat which is positionable onto the second seat surface.

11. The seat arrangement according to claim 1, wherein the second backrest is lower than the first backrest.

12. The seat arrangement according to claim 1, wherein the second seat and the directly adjacent first seat are arranged such that no gap is formed between the second seat and the directly adjacent first seat.

13. A passenger cabin comprising:
a cabin floor;
a cabin interior trim;
a plurality of passenger seats arranged on the cabin floor; and
at least one seat arrangement according to claim 1.

14. An aircraft comprising:
an aircraft fuselage; and
a passenger cabin in the aircraft fuselage, the passenger cabin configured according to claim 13.

15. The aircraft according to claim 14, wherein:
the aircraft has a conical shape at at least one axial end of the aircraft fuselage at least in some regions; and
the at least one seat arrangement is arranged at the at least one axial end.

16. The aircraft according to claim 14, wherein:
the seat arrangement extends from an aisle to the cabin interior trim; and
the first seat which is oriented toward the aisle terminates flush with the aisle.

17. The aircraft according to claim 14, wherein the passenger cabin has at least one seat row arranged between two aisles, and which has at least one seat arrangement.

* * * * *